United States Patent Office 3,378,461
Patented Apr. 16, 1968

3,378,461
PROCESS FOR MAKING 5(4)-AMINO-4(5)-IMIDAZOLECARBOXAMIDE RIBOSIDE - 5' - PHOSPHORIC ACID
Hsing T. Huang, Groton, and Gilbert M. Shull, Old Lyme, Conn., assignors to Chas. Pfizer & Co., Inc., New York, N.Y., a corporation of Delaware
No Drawing. Original application Aug. 28, 1963, Ser. No. 305,223. Divided and this application Dec. 7, 1966, Ser. No. 616,142
4 Claims. (Cl. 195—28)

ABSTRACT OF THE DISCLOSURE

5(4)-amino - 4(5) - imidazolecarboxamide riboside-5'-phosphoric acid produced by enzymatic phosphorylation of 5(4)-amino-4(5)-imidazole-carboxamide riboside, using an orthophosphate in the presence of actively fermenting yeast under certain conditions of temperature and pH. The product is a flavor enhancer for foodstuffs.

---

This application is a division of the copending application Serial No. 305,223, filed August 28, 1963, and now abandoned.

The present invention relates to a method for improving the flavor of foodstuffs. More particularly, it relates to a method for improving the flavor of foodstuffs by the addition thereto of 5(4)-amino-4(5)-imidazolecarboxamide riboside-5'-phosphoric acid or its non-toxic salts. It further relates to a biochemical process for the production of 5(4)-amino-4(5)-imidazolecarboxamide riboside-5'-phosphoric acid by the phosphorylation of 5(4)-amino-4(5)-imidazolecarboxamide riboside.

The use of flavor enhancers, that is, flavoring agents or condiments to bring out the natural flavor of foods and to enhance the taste or flavor of foods is well-known. Flavor enhancers, or chemical condiments or seasoning agents, as they are often referred to, such as monosodium glutamate and sodium succinate have found wide spread use in the home, restaurants and food processing industry. More recently, a new class of flavor enhancer has received increasing attention, at least one of which appears destined for wide spread acceptance. This new class of compounds comprises the naturally occurring 5'-nucleotides all of which contain the purine nucleus. According to the literature the more active compounds within this class are 5'-inosinic acid (inosinic acid), 5'-guanylic acid and 5'-xanthilic acid. Other compounds reportedly active as flavor enhancers are 5'-cytidilic and 5'-uridylic acid which contain the pyrimidine portion but not the fused imidazole ring system of the purines.

In a study on the relationship between the structure of inosinic acid and its taste enhancing property, Kuninaka (Yakkayoku 11, 1229/32 (1960)) determined that hypoxanthine and inosine which are precursors of inosinic acid are inactive as flavor enhancers as are the 2'- and 3'-inosinic acids. Phosphorylation at the 5'-position of the ribose moiety is essential for flavor enhancement.

It has now been unexpectedly and surprisingly found that 5(4)-amino-4(5)-imidazolecarboxamide riboside 5'-phosphoric acid and its non-toxic salts are potent flavor enhancers and are at least as effective as inosinic acid. They are of value as flavor enhancers (condiments or seasoning agents) for improving the taste or flavor of any form of foodstuffs, such as soups, sauces, pastes, canned foods, boiled foods, pickled foods, beverages, breads, juices, cereals, meat products, dairy products, pastries and sweets, but are more highly suited for certain types of foodstuffs such as soups, meats, sauces and pastes. In some instances these materials may also effect the aroma of foods. This appears to be particularly true in the case of soups and broths.

5(4)-amino-4(5)-imidazolecarboxamide riboside - 5'-phosphoric acid and its non-toxic salts are of great economic potential, particularly as regards the utilization of special diets and food sources which are presently not accepted by all people. The flavor of such food sources is generally responsible for their poor acceptance. 5(4)-amino-4(5)-imidazolecarboxamide riboside-5'-phosphoric acid and its non-toxic salts, by virtue of their ability to bring out, to blend and modify flavors, to enhance existing flavors and to suppress undesirable flavors, may overcome the objections to such foods and thus improve the utilization of available foodstuffs.

5(4)-amino - 4(5) - imidazolecarboxamide riboside-5'-phosphoric acid forms a wide variety of salts with both inorganic and organic bases, including basic amino acids such as histidine and arginine. 5(4-amino-4(5)-imidazolecarboxamide riboside 5'-phosphoric acid itself, when placed as a small quantity upon the tongue, produces an immediate and long lasting sensation. The taste is primarily meaty and mouthfilling followed by a somewhat astringent sensation. The disodium salt of a 5(4)-amino-4(5)-imidazolecarboxamide riboside-5'-phosphoric acid and in fact the non-toxic salts of 5(4)-amino-4(5)-imidazolecarboxamide riboside-5'-phosphoric acid produce substantially the same taste sensation, per se indicating that the taste enhancing property is due to the 5(4)-amino-4(5)-imidazolecarboxamide riboside-5'-phosphoric acid anion itself. The alkali metal salts appear to bring about a more immediate effect than does the acid form probably because of their greater solubility, rate and degree of ionization. Dilute aqueous solutions of 5(4)-amino-4(5)-imidazolecarboxamide riboside-5'-phosphoric acid and its non-toxic salts are readily distinguishable tastewise from water itself.

The disodium salt of 5(4)-amino-4(5)-imidazolecarboxamide riboside-5'-phosphoric acid and the free acid are the preferred forms since they are easily and economically prepared and afford the same tactile sensations as do other salts. However, it is contemplated within the purview of this invention that other non-toxic salts such as the potassium, calcium, magnesium, aluminum, the ammonium, histidine, lysine and arginine salts are substantially equivalent to the disodium salt as regards their flavor enhancing property.

5(4)-amino - 4(5) - imidazolecarboxamide riboside-5'-phosphoric acid and its non-toxic salts may be used per se in a given foodstuff or may be used as mixtures of two or more salts or in mixture with other flavor enhancers such as monosodium glutamate, sodium succinate and 5'-guanylic and inosinic acids and salts thereof. For example, disodium 5(4)-amino - 4(5) - imidazolecarboxamide riboside-5'-phosphoric acid may be used in combination with monosodium glutamate, sodium-5'-guanylate or disodium inosinate. In such instances the improvement in taste or flavor realized appears to be due to co-action between the flavoring agents and is frequently greater than the effect of either enhancer per se.

For convenience of use, particularly by the individual user, disodium-5(4)-amino - 4(5) - imidazolecarboxamide riboside-5'-phosphoric acid may be mixed with a suitable carrier or diluent such as sodium chloride, magnesium carbonate, spices, malt, calcium stearate, hickory smoked dried yeast and dextrose. The concentration of the riboside in such compositions can, of course, vary widely; however, concentrations of from about 5% to about 75% by weight of 5(4)-amino - 4(5) - imidazolecarboxamide riboside-5'-phosphoric acid have been found satisfactory. Higher or lower concentrations afford no advantages.

The quantity of disodium 5(4)-amino-4(5)-imidazolecarboxamide riboside-5'-phosphoric acid to be added to a given foodstuff depends primarily on the nature of the foodstuff and is easily determined by a simple taste test of the thus treated foodstuff. It has been noted that a several fold difference may exist between the amount of disodium 5(4)-amino-4(5)-imidazolecarboxamide riboside-5'-phosphoric acid sufficient to bring about a significant change in flavor of a given foodstuff and that which will effect maximum flavor improvement. However, since an excess of the flavor enhancer imparts no unpleasant taste to the foodstuff this problem is economic rather than organoleptic in nature. Similar remarks apply to 5(4)-amino-4(5)-imidazolecarboxamide riboside-5'-phosphoric acid and its other non-toxic salts since, as previously mentioned, the 5(4)-amino-4(5)-imidazolecarboxamide riboside-5'-phosphoric acid anion is the active moiety.

The flavor enhancing property of 5(4)-amino-4(5)-imidazolecarboxamide riboside-5'phosphoric acid and its non-toxic salts is detectable in most foodstuffs at concentrations of about 0.005%. In beverages, concentrations of, as low as 0.001%, may bring about noticeable improvements in flavor. In general, concentrations of from about 0.001% to about 0.1% are suitable for most foodstuffs.

5(4)-amino - 4(5) - imidazolecarboxamide riboside-5'-phosphoric acid can be produced by enzymatic procedures as is well known. Greenberg (J. Biol. Chem. 219, 423) for example, phosphorylates 5(4)-amino-4(5)-imidazolecarboxamide riboside by a mixture of enzyme extracts prepared from brewer's yeast and muscle using adenosine triphosphate as phosphorylating agent. Flaks et al. (J. Am. Chem. Soc. 76, 2275) form the ribotide by reacting inosinic acid with glycine in the presence of an enzyme isolated from pigeon liver extract and in still another method by the direct condensation of 5(4)-amino-4(5)-imidazolecarboxamide and 5'-phosphoribosyl pyrophosphate (J. Biol. Chem. 228, 201). More recently a chemical method for its preparation was reported by Shaw (J. Am. Chem. Soc. 83, 4700) utilizing inosine as starting material.

The known methods for the preparation of 5(4)-amino-4(5)-imidazolecarboxamide riboside-5'-phosphoric acid including the enzymatic phosphorylation of 5(4)-amino-4(5)-imidazolecarboxamide riboside require highly purified systems and are unsuitable for large scale commercial production.

It has now been found 5(4)-amino-4(5)-imidazolecarboxamide riboside can be conveniently and economically phosphorylated by incubation with an orthophosphate in the presence of an actively fermenting brewer's yeast. Adenosine may be added to the fermentation in catalytic amounts, e.g., 1% of the substrate or less, since it frequently accelerates the phosphorylation. Under the conditions of the present process phosphorylation of the 5(4)-amino-4(5)-imidazolecarboxamide riboside is substantially complete. Ninety to ninety-five percent of the phosphorylation product is 5(4)-amino-4(5)-imidazolecarboxamide riboside-5'-phosphoric acid. A small amount of more highly phosphorylated products, presumably di- and triphosphorylated products, are also obtained. The process is readily adapted to large scale production.

The process of the present invention permits the isolation and recovery of 5(4)-amino-4(5)-imidazolecarboxamide riboside-5'-phosphoric acid as the crystalline monohydrate from which the crystalline anhydrous form is readily obtained, if desired, by drying. This is the first instance wherein the crystalline product has been isolated. Prior art methods have isolated 5(4)-amino-4(5)-imidazolecarboxamide riboside phosphoric acid as the crude barium salt or, because of isolation difficulties, have not isolated the ribotide but identified it by means of paper chromatography or by means of its chemical or biochemical reactions. The crystalline monohydrate has obvious advantages over the salts as a means of isolating pure 5(4)-amino-4(5)-imidazolecarboxamide riboside-5'-phosphoric acid since it precipitates from aqueous solutions and is thus easily and conveniently purified further if need be. Additionally, it and the anhydrous form represent convenient forms for use in formulations and compositions comprising 5(4)-amino-4(5)-imidazolecarboxamide riboside-5'-phosphoric acid as a flavor enhancer, and for the preparation of pure salts of 5(4)-amino-4(5)-imidazolecarboxamide riboside-5'-phosphoric acid, e.g. the sodium, potassium and histidine salts.

In its broader aspect the process of the present invention comprises incubating 5(4)-amino-4(5)-imidazolecarboxamide riboside and an orthophosphate in the presence of an actively fermenting yeast. A wide variety of yeasts have been found operative in the process of this invention. Preliminary testing of yeasts for phosphorylating activity can be carried out to determine whether such activity is present and the approximate relative value of the activity.

The test method favored for selecting active yeast comprises fermenting a culture of the yeast under investigation on a suitable medium such as is described below with 5(4)-amino-4(5)-imidazolecarboxamide riboside-5'-phosphoric acid as substrate. A volume of carbon tetrachloride-toluene solution (1:1), equal to about 2–10% of the total volume of the reaction mixture, is added to increase cell permeability. The reaction is conducted at from about 25° to 40° C. preferably at 28–30° C. and analyzed periodically by paper chromatography in the system methyl ethyl ketone: acetic acid: water in the proportion 9:2.5:3 (Huang, Appl. Microbiol 9, 419) coupled with the Bratton Marshall test to determine the extent of phosphorylation. (Ravel, J. Biol. Chem. 172, 67).

Representative yeasts operative in the present process are strains of the genera Saccharomyces, Schizosaccharomyces, Zygosaccharomyces, Saccharomyces, Saccharomycopsis, Monosporella, Mycoderma, Nematospora, Torulopsis such as *Saccharomyces cerevisiae,* Hansen ATCC 2338, 2341, 2373, 4111, 9763, 11795, *Saccharomyces carlsbergensis,* Hansen, ATCC 2345, 2700, 9373, 10596, *Saccharomyces cerevisiae* var. *ellipsoideus* (Hansen) Dekker ATCC 560, 2355, 10607, *Saccharomyces uvarum* ATCC 9771, 10613, *Saccharomyces rouxii,* Boutroux ATCC 2619, 10383, *Saccharomyces delbruecki* Lindner ATCC, 9770, 10600, *Schizosaccharomyces octosporus* ATCC 2479, 4206, *Schizosaccharomyces pombe* Lindner ATCC 2476, 2478, *Zygosaccharomyces vini* ATCC 10687, *Saccharomycodes ludwigii* Hansen ATCC 11313, *Mycoderma cerevisiae* ATCC 10641, 10642, *Nematospora coryli,* Peglion ATCC 10647, 10648, 10661, *Torulopsis candida* (Saito) Lodder ATCC 2560 and *Torulopsis sphaerica* ATCC 8549, 8637.

The yeast can be any yeast such as brewer's yeast. Such yeasts can be obtained from a brewery or can be propagated from a slant culture. For reasons of convenience and economy it is preferred to use the yeast obtained from breweries. In the case of the other yeasts referred to above it is generally necessary to propagate them from slants. In any case, regardless of the yeast used or of its source it has been found advantageous to first activate the yeast prior to the fermentation reaction in order to produce optimum conversion of the riboside substrate to the ribotide. This activation is accomplished by incubating the yeast in a medium containing glucose, disodium hydrogen phosphate and sodium dihydrogen phosphate at 30° C. for 30 minutes and subsequently treating the yeast with ultrasonics or solvents so as to increase cell permeability.

The media used for conducting the incubation process may be varied. The process is operated at a pH of from about 4.0 to 8.0. Hop-wort or a medium composed basically of a source of nitrogen, of a carbohydrate, and of minerals is required. Satisfactory nitrogen sources include materials, such as hydrolyzed casein of various types, distiller's solubles, etc. Suitable carbohydrate sources are dextrose, glucose, etc. The yeast may also be a growing culture which is maintained on nutrient medium for growth of the organism in flasks under stationary conditions. The entire culture is subsequently transferred to a larger vessel containing the same medium and the transfers repeated until a sufficient quantity of the yeast is produced. A suitable medium is the following which contains: yeast extract (5.0 g./l.), dextrose (50.0 g./l.), potassium dihydrogen phosphate (0.6 g./l.), potassium chloride (0.4 g./l.), calcium chloride (0.1 g./l.), magnesium sulfate heptahydrate (0.4 g./l.), ferric chloride hexahydrate (0.003 g./l.), and manganese sulfate (0.003 g./l.). The yeast cells are then collected and activated in the manner described above.

The yeast must be treated in order to make the cell walls permeable to the phosphorylated products. The enzymatic phosphorylation is intracellular. An increase in cell wall permeability is effected by any of the standard methods such as treatment with solvents like benzene, toluene, xylene, chloroform or mixtures thereof or by treatment with ultrasonic energy. The conditions must be mild enough such that the cells retain their phosphorylating activity. Failure to realize this reduces and even destroys the phosphorylating activity of the yeast. The preferred method is by treatment of the reaction mixture with carbon tetrachloride and toluene in approximately equal volumes. A combined volume of toluene plus carbon tetrachloride of from about 2%–10% of the total volume of the reaction mixture affords satisfactory results.

The fermentation is usually conducted at a pH of from about 5.0 to 8.0 and a temperature of about 30° C., although this temperature may be varied somewhat from about 25° to 40° C., for a period of from 3 to 24 hours and preferably 3 to 10 hours after the substrate has been added. Mild agitation throughout the fermentation process, such as gentle shaking or stirring is necessary. Periodically, samples of the reaction mixture are analyzed by paper chromatography, coupled with the Bratton and Marshall method, to determine the degree of phosphorylation. This procedure may be employed to follow the course of the reaction. Suitable solvent systems are 80% n-propanol in water (v./v.) and methyl ethyl ketone: acetic acid:water in the proportion of 9:2.5:3. (Huang, Appl. Microbiol. 9, 419).

It is to be understood that for the production of 5(4)-amino-4(5)-imidazolecarboxamide ribotide according to the present invention, limitation to the aforesaid organisms is not intended. It is especially desired and intended to include mutants produced from these strains of these organisms by various means such as irradiation with X-rays or ultraviolet light, treatment with nitrogen mustards, single cell culture techniques, and the like.

It is also intended to include any organism, regardless of its appearance or physiological behavior, that may be developed by means of transformation, transduction, genetic recombination or some other genetical procedure, using a nucleic acid or an equivalent material from the herein described species, whereby it has acquired the ability to produce the elaboration products here described or to carry on the biochemical changes here described.

The 5(4)-amino-4(5)-imidazolecarboxamide riboside-5'-phosphoric acid may be recovered from the fermentation medium by a variety of methods. A convenient method involves adsorption of the 5(4)-amino-4(5)-imidazolecarboxamide riboside-5'-phosphoric acid on a column of Dowex-1 resin operating in the formate, acetate, chloride or sulfate cycle (a strong cation exchange resin available from the Dow Chemical Company and comprising styrenedivinyl aromatic copolymers containing functional sulphonic acid groups). The column is then washed with distilled water and the ribotide eluted therefrom with the dilute aqueous acid corresponding to the anion cycle of the resin used. The 5(4)-amino-4(5)-imidazolecarboxamide riboside-5'-phosphoric acid crystallizes from the eluate and is recovered by filtration. Additional product is obtained from the filtrate by known methods, e.g. concentration in the case of acetic, formic and hydrochloric acids, or, in the case of the sulfuric acid by removal of the sulfate as barium sulfate and precipitation of the ribotide at its isoelectric point.

The 5(4)-amino-4(5)-imidazolecarboxamide riboside substrate is obtained biochemically according to the method of Shiro et al. Agr. Biol. Chem. 26, 785 (1962) in which the riboside is accumulated in the growing culture medium of a base auxotroph of *Bacillus subtilies*.

The following examples are given by way of illustration and are not to be construed as limitations of this invention, many variations of which are possible without departing from the scope and spirit thereof.

Example I

Brewer's yeast, used in the brewing of lager beer and received from the brewery as a pressed cake, is grated through a 10-mesh screen, dried in air overnight, then stored in a refrigerator. 105 grams of this dried yeast is added to a two liter flask containing

| | |
|---|---:|
| Glucose _____ g__ | 15.0 |
| Disodium hydrogen phosphate _____ g__ | 12.8 |
| Dihydrogen sodium phosphate _____ g__ | 8.28 |
| Tap water (30° C.) _____ ml__ | 900 | and the flask placed in a constant temperature bath (30° C.) and magnetically stirred for 30 minutes. Then, the following materials are added:

| | |
|---|---:|
| Glucose _____ g__ | 10.0 |
| ALCAR$_1$ _____ g__ | 9.3 |
| Adenosine _____ mg__ | 50 |
| Carbon tetrachloride _____ mg__ | 10 |
| Toluene _____ mg__ | 10 |

$^1$ 5(4)-amino-4(5)-imidazolecarboxamide riboside.

Papergrams are run every half hour by spotting a one microliter portion of the reaction mixture and developing in the system methyl ethyl ketone (9): acetic acid (2.5): water (3) for one half hour. The papergram is dried and sprayed with Bratton and Marshall reagent. Rf of the riboside is 0.6 and of the ribotide is 0.25.

The system, pH 6.2, is stirred at 30° C. for 2 hours after which 5.0 g. glucose is added. (The voluminous foam produced gradually subsides.) The stirring is continued an additional 7 hours until reaction is complete then the reaction (pH 6.0) refrigerated overnight. It is then centrifuged, decanted and the residue washed three times with water (3× 300 ml.). Paper chromatography of the supernatant and each of the three wash liquors in the system, methyl ethyl ketone:acetic acid:water (9:2.5:3), followed by Bratton-Marshall test of the chromatograms, gives a positive test for the ribotide. A fourth water wash of the residue is found to contain only a trace of ribotide.

Example II

The phosphorylation process of Example I is repeated in duplicate and the combined supernatants and wash liquors (4.1 liters) passed through a column of Dowex-1, formate cycle, column size 2 liters resin, prepared by regenerating Dowex-1, chloride cycle, with 2 liters of 2 N sodium formate followed by washing with 12 liters of distilled water. Eight hundred ml. fractions are taken at the rate of one every 20 minutes. The column is washed with 8 liters of distilled water at the above rate. Paper chromatography of the individual fractions shows only a trace of riboside and no ribotide to be present.

The column is then eluted with 2 N formic acid at the rate of a 200 ml. fraction every 15 minutes until the eluate contains only a slight trace of the ribotide. The fractions containing the ribotide (determined by paper chromatography) are combined and freeze dried. The fractions (35–46) obtained after eluting with about 4 liters of formic acid produce, on standing in the refrigerator, crystalline ribotide as the monohydrate. The crystalline ribotide is filtered off, washed with methanol and dried (7.0 g.). The filtrate is combined with the remaining eluate and freeze-dried. The freeze dried residue is suspended in 200 ml. distilled water, stirred for 30 minutes and 50 ml. more distilled water added. The suspension is then cooled in an ice-water bath, stirred for 30 minutes and filtered. The cake is washed with methanol and air dried (14.6 g.). The aqueous filtrate can be freeze dried and re-worked as above.

Total yield=21.6 g. (86.7% based on the riboside used; 90.2% recovery from the broth).

Analysis.—Calcd. for $C_9H_{15}N_4O_8P \cdot H_2O$: 30.3% C; 4.8% H; 15.7% N. Found: 30.0% C; 5.1% H; 15.5% N.

Molecular weight of potentiometric titration=362. Calculated value for the monohydrate is 356.2. The ultraviolet absorption spectra of both crops agrees with the literature values.

Example III

A nutrient medium having the following composition is prepared and sterilized at 120° C. for 30 minutes.

| | Grams/liter |
|---|---|
| Yeast extract | 5.0 |
| Dextrose | 50.0 |
| Potassium dihydrogen phosphate | 0.6 |
| Potassium chloride | 0.4 |
| Calcium chloride | 0.1 |
| Magnesium sulfate heptahydrate | 0.1 |
| Ferric chloride hexahydrate | 0.003 |
| Manganese sulfate | 0.003 |

Distilled water to volume.

Inoculum is prepared by transferring *Saccharomyces carevisia* ATCC 11795 to a 300 ml. Erlenmeyer flask containing 50 ml. of the above medium. The inoculated flask is incubated stationary at 28° C. for one day with gentle shaking by hand every four hours. The entire culture is then transferred to a Fernbach flask containing one liter of the same medium. Following the same stationary incubation process as before the yeast is used to inoculate a fermenter containing 10 liters of medium. The same stationary technique with gentle shaking or stirring every four hours is used. The yeast cells are collected by centrifugation and washed with ice-cold water.

Ninety-four ml. of yeast cells prepared in this manner are slurried in 70 ml. of water and added to a flask containing 3.75 g. dextrose, 3.2 g. disodium hydrogen phosphate, 2.07 g. sodium dihydrogen phosphate monohydrate and 50 ml. water. The volume is made up to 250 ml. and the mixture stirred at 30° C. for 30 minutes. Then 2.0 g. dextrose, 2.58 g. 5(4)-amino-4(5)-imidazolecarboxamide riboside, 100 mg. adenosine, 2.5 ml. carbon tetrachloride and 2.5 ml. toluene are added, the mixture stirred at 30° C. for 2 hours, and 1.75 g. dextrose added. The reaction is followed by means of paper chromatography as in Example I. The reaction mixture is centrifuged after 4.3 hours and the yeast cells washed with water. The combined wash and centrifugate is worked up by the procedure of Example II.

Example IV

The procedure of Example III is repeated but using the following yeasts. In each instance 5(4)-amino-4(5)-imidazolecarboxamide riboside-5'-phosphoric acid is produced. The product was not identified by paper chromatography combined with the Bratton-Marshall test.

*Saccharomyces cerevisiae* Hansen ATCC 2338, 2341, 2373, 4111, 9763
*Saccharomyces crevisiae* var. *ellipsoideus* Hansen Dekker ATCC 560, 2355, 10607
*Saccharomyces uvarum* ATCC 9771, 10613
*Saccharomyces carlsbergensis* Hansen ATCC 2345, 2700, 9373, 10596
*Saccharomyces rouxii* Boutroux ATCC 2619, 10383
*Saccharomyces delbruecki* Lindner ATCC 9770, 10600
*Schizosaccharomyces octosporus* ATCC 2479, 4206
*Schizosaccharomyces pombe* Lindner ATCC 2476, 2478
*Saccharomycodes ludwigii* ATCC 11313
*Mycoderma cerevisiae* ATCC 10641, 10642
*Nematospora coryli* Peglion ATCC 10647, 10648, 10661
*Torulopsis candida* (saito) Lodder ATCC 2560
*Torulopsis sphaerica* ATCC 8549, 8637

Example V

The procedure of Example I is repeated but substituting the brewer's yeast employed therein by a brewer's yeast used to produce ale. The 5(4)-amino-4(5)-imidazolecarboxamide riboside-5'-phosphoric acid is detected as outlined in Example I.

Brewer's yeasts used in the production of stout, porter and sake produce similar results when used according to the procedure of Example I.

Example VI

Repetition of the procedure of Example I at pH values of 5.0, 7.0 and 8.0 gives in each case substantial conversion of 5(4)-amino-4(5)-imidazole carboxamide riboside to the ribotide.

The combined supernatant and wash liquors are worked up according to the procedure of Example II using the acetate form of Dowex-1 in place of the formate and eluting the column with 2 N acetic acid. The monohydrate form of the ribotide is obtained. The anhydrous form is obtained on drying in vacuo at 100° C.

Example VII

The procedure of Example I is repeated but conducting the reaction at 25° C. and 40° C. and in the absence of added adenosine. In each case the ribotide is obtained in satisfactory yield based on the riboside used.

Example VIII

The procedure of Example II is repeated but using Dowex-1 chloride in place of the formate. The ribotide is eluted with 2 N hydrochloric acid and the ribotide recovered by freeze-drying the eluate.

Example IX

To 0.01 mole of 5(4)-amino-4(5)-imidazolecarboxamide riboside-5'-phosphoric acid in 25 ml. water there is added 0.02 mole of sodium hydroxide as a 1 N solution. The resulting solution is filtered if necessary then freeze dried to give the disodium salt.

In like manner, but substituting equimolar quantities of potassium hydroxide, ammonium hydroxide, magnesium hydroxide, calcium hydroxide, aluminum hydroxide, histidine, lysine and arginine for sodium hydroxide the corresponding dipotassium, diammonium, magnesium, calcium, aluminum, histidine, lysine, and arginine salts are produced.

Example X

The procedure of Example IX is repeated but using 0.01 mole of sodium hydroxide in place of 0.02 mole to give the monosodium salt.

In like manner, the monoammonium, monopotassium, monohistidine, monolysine and monoarginine salts are prepared using one molar proportion of the appropriate base.

Example XI

To one liter of beef bouillon there is added 100 mg. (0.01% by weight) of 5(4)-amino-4(5)-imidazolecarboxamide riboside-5'-phosphoric acid and the mixture cooked to provide a bouillon having improved flavor and aroma.

Example XII

To a liter of chicken broth is added a suitable amount of table salt and spices commonly used to prepare soup and 200 mg. (0.02% by weight) of disodium 5(4)-amino-4(5)-imidazolecarboxamide riboside-5'-phosphoric acid. The finished soup is of considerably improved flavor.

Example XIII

To one liter of the chicken broth referred to in Example XII there is added suitable amounts of table salt and spices used to prepare soup, 100 mg. of disodium 5(4)-amino-4(5)-imidazolecarboxamide riboside-5'-phosphoric acid and 100 mg. of disodium inosinate to give a finished soup of much improved flavor.

Example XIV

Vegetable soup seasoned with a suitable quantity of table salt is further treated with 0.02% by weight of disodium 5(4)-amino-4(5)-imidazolecarboxamide riboside-5'-phosphoric acid and 0.05% by weight of monosodium glutamate. The mixture is cooked to provide a soup of better taste or flavor.

Example XV

Beef bouillon is seasoned with a suitable quantity of table salt and further seasoned with 0.02% by weight of disodium 5(4)-amino-4(5)-imidazolecarboxamide riboside-5'-phosphoric and 0.01% by weight disodium-5'-guanylate to give a bouillon of improved flavor and aroma.

Example XVI

One liter quantities of the beef bouillon referred to in Example XII are treated with one of the following salts of 5(4)-amino-4(5)-imidazolecarboxamide riboside-5'-phosphoric acid or one of the combinations of flavor enhancers listed below. The quantities added are given in percent by weight.

Monosodium salt (0.02%)
Dipotassium salt (0.01%)
Histidine salt (0.015%)
Arginine salt (0.015%)
Calcium salt (0.01%)
Lysine salt (0.02%)
Aluminum salt (0.01%)
Monosodium salt (0.01%) plus disodium inosinate (0.01%)
Dipotassium salt (0.01%) plus disodium-5'-guanylate (0.01%)
Histidine salt (0.015%) plus disodium-5'-guanylate (0.01%)

In each instance improved flavor is imparted to the bouillon.

Example XVII

An 8-ounce slice of roast beef, rare, is seasoned with 0.1 g. of a mixture comprising equal quantities by weight of disodium 5(4)-amino-4(5)-imidazolecarboxamide riboside-5'-phosphoric acid and sodium chloride to provide meat of considerably improved flavor.

Example XVIII

An 8 ounce charcoal broiled hamburger patty is seasoned with 0.1 g. of a mixture comprising 10% disodium 5(4)-amino-4(5)-imidazolecarboxamide riboside-5'-phosphoric acid, 70% monosodium glutamate, 18% table salt, and 2% calcium stearate to provide a hamburger patty having improved flavor.

Example XIX

An 8 ounce hamburger patty, charcoal broiled, is seasoned with a mixture comprising 50% disodium 5(4)-amino-4(5)-imidazolecarboxamide riboside-5'-phosphoric acid, 40% table salt, 8% hickory smoked dried yeast and 2% calcium stearate to provide a hamburger having improved taste.

Example XX

In a test designed to determine the flavor enhancing power of disodium 5(4)-amino-4(5)-imidazolecarboxamide riboside-5'-phosphoric acid (disodium AICARP) relative to that of disodium inosinate, a triangular taste test is arranged. Three samples of each of the several finished soups listed below are taken. To one sample of each of the soups there is added disodium 5(4)-amino-4(5)-imidazolecarboxamide riboside-5'-phosphoric acid on a percent by weight basis in the amounts indicated. To a second sample of each of the soups equal amounts by weight of disodium inosinate are added. The third sample of each soup is not treated and is the "odd" sample.

| Soup | Sample 1 Disodium AICARP | Sample 2 Disodium Inosinate |
|---|---|---|
| | Percent | Percent |
| Chicken noodle | 0.03 | 0.03 |
| Beef bouillon | 0.028 | 0.028 |
| Onion | 0.02 | 0.02 |
| Tomato | 0.015 | 0.015 |
| Cream of mushroom | 0.032 | 0.032 |

The disodium 4(5)-amino-5(4)-imidazolecarboxamide riboside-5'-phosphoric acid is used as its dihydrate and the disodium inosinate as a hydrate having the equivalent of 7½H$_2$O.

In such instance at least 4 out of 5 members of a taste panel of 5 persons distinguished, without hesitation, the "odd" sample. No difference in flavor enhancement of the treated samples of the several soups was noted by any member of the panel. Unanimous agreement as to the equivalent and improved flavor over the "odd" sample was noted.

Example XXI

A mixture comprising equal parts by weight of disodium 5(4)-amino-4(5)-imidazolecarboxamide riboside-5'-phosphoric acid and disodium-5'-guanylate is added to each of several finished soups on a weight basis as indicated.

| Soup: | Mixture (percent by weight) |
|---|---|
| Chicken noodle | 0.0075 |
| Cream of mushroom | 0.032 |
| Tomato | 0.015 |
| Onion | 0.02 |
| Beef bouillon | 0.005 |
| Onion | 0.01 |
| Tomato | 0.005 |
| Cream of mushroom | 0.008 |

In each instance, a soup of improved flavor is produced.

Example XXII

A composition comprising 10% by weight of disodium 5(4)-amino-4(5)-imidazolecarboxamide riboside-5'-phosphoric acid dihydrate and 90% by weight of monosodium glutamate is used to season sliced roast beef. The resulting meat is of much improved flavor. The flavor enhancing effect is obtained on both hot and cold roast beef.

Example XXIII

Sliced roast beef is seasoned with a composition comprising 95% monosodium glutamate, 5% disodium 5(4)-amino-4(5)-imidazolecarboxamide riboside-5'-phosphoric acid and 5% disodium 5'-guanylate to provide meat of markedly improved flavor. The composition is effective on both hot and cold beef.

What is claimed is:

1. A process for making 5(4)-amino-4(5)-imidazolecarboxamide riboside-5'-phosphoric acid which comprises first increasing the permeability of the cell wall of the yeast by treating the yeast with ultrasonic energy or with a solvent selected from the group consisting of benzene, toluene, xylene, chloroform, mixtures thereof and mixtures of toluene and carbon tetrachloride under conditions such that the yeast cells retain their phosphorylating activity and then incubating 5(4)-amino-4(5)-imidazolecarboxamide riboside and an orthophosphate with this pretreated, actively fermenting yeast at a temperature of from about 25 to about 40° C. and a pH of from about 5.0 to 8.0.

2. The process of claim 1 wherein adenosine is added to the fermentation.

3. The process of claim 2 wherein the yeast is brewer's yeast.

4. The process of claim 1 wherein the yeast is pretreated with between about 2% and 10% by total volume of a mixture consisting of approximately equal volumes of carbon tetrachloride and toluene.

References Cited

UNITED STATES PATENTS

| | | | |
|---|---|---|---|
| 2,844,514 | 7/1958 | Morell et al. | 195—28 |
| 3,150,058 | 9/1964 | Katagiri et al. | 195—28 |

OTHER REFERENCES

Greenberg, J. Biol. Chem., vol. 219, pages 423 to 433 (1956).

ALVIN E. TANENHOLTZ, *Primary Examiner.*